(12) United States Patent
Sanamrad

(10) Patent No.: US 10,728,115 B2
(45) Date of Patent: Jul. 28, 2020

(54) METHOD, MEDIUM, AND SYSTEM FOR ENSURING QUALITY OF A SERVICE IN A DISTRIBUTED COMPUTING ENVIRONMENT

(71) Applicant: International Business Machines Corporation, Armonk, NY (US)

(72) Inventor: Mohammad A. Sanamrad, Lidingo (SE)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 14/265,512

(22) Filed: Apr. 30, 2014

(65) Prior Publication Data

US 2014/0297848 A1    Oct. 2, 2014

Related U.S. Application Data

(63) Continuation of application No. 11/575,225, filed as application No. PCT/EP2005/055857 on Nov. 9, 2005, now Pat. No. 8,781,909.

(30) Foreign Application Priority Data

Nov. 25, 2004 (GB) .................................. 0425860.4

(51) Int. Cl.
*G06Q 30/00* (2012.01)
*H04L 12/24* (2006.01)
(Continued)

(52) U.S. Cl.
CPC ........ *H04L 41/5022* (2013.01); *G06F 9/5055* (2013.01); *G06Q 10/06395* (2013.01); *G06F 2209/5015* (2013.01)

(58) Field of Classification Search
CPC ............... H04L 41/5022; G06F 9/5055; G06F 2209/5015; G06Q 10/06395
See application file for complete search history.

(56) References Cited

U.S. PATENT DOCUMENTS 5,129,077 A    7/1992  Hillis
5,317,726 A    5/1994  Horst
(Continued)

FOREIGN PATENT DOCUMENTS

JP    2001282760    10/2001
JP    2002223211    8/2002
(Continued)

OTHER PUBLICATIONS

Gunasekaran, Angappa, Christopher Patel, and Ronald E. McGaughey. "A framework for supply chain performance measurement." International journal of production economics 87.3 (2004): 333-347. (Year: 2004).*

(Continued)

*Primary Examiner* — Matthew E Zimmerman
(74) *Attorney, Agent, or Firm* — Schmeiser, Olsen & Watts, LLP; Mark Vallone

(57) ABSTRACT

A method and system for determining a service provider to perform a service. An indication of willingness by each service provider of at least two service providers to perform the service in conformity with at least two quality of service requirements is received. Both an indication of previous performance of the service by each service provider and statistical data indicative of an extent to which the previous performance of the service by each service provider matches each quality of service requirement are received. A preferred service provider of the at least two service providers is ascertained, by analyzing the statistical data and concluding that the performance of the service by the preferred service provider is a closer match to the at least two quality of (Continued)

service requirements than is a match of the performance of the service by each other service provider to the at least two service requirements.

16 Claims, 5 Drawing Sheets

(51) Int. Cl.
*G06Q 10/06* (2012.01)
*G06F 9/50* (2006.01)

(56) References Cited

U.S. PATENT DOCUMENTS

| | | | |
|---|---|---|---|
| 6,161,099 A | 12/2000 | Harrington et al. | |
| 6,363,453 B1 | 3/2002 | Esposito et al. | |
| 6,871,181 B2* | 3/2005 | Kansal | G06Q 10/0639 705/4 |
| 7,155,400 B1 | 12/2006 | Jilk et al. | |
| 7,159,007 B2 | 1/2007 | Stawikowski | |
| 7,254,645 B2 | 8/2007 | Nishi | |
| 7,330,826 B1* | 2/2008 | Porat | G06Q 30/0601 705/26.3 |
| 7,340,508 B1 | 3/2008 | Kasi et al. | |
| 7,461,166 B2 | 12/2008 | Doyle et al. | |
| 7,945,469 B2* | 5/2011 | Cohen | G06Q 10/06 705/7.14 |
| 8,332,263 B2* | 12/2012 | Ramesh | G06Q 99/00 705/7.39 |
| 8,781,909 B2 | 7/2014 | Sanamrad | |
| 2001/0032170 A1* | 10/2001 | Sheth | G06Q 10/0631 705/37 |
| 2002/0055900 A1* | 5/2002 | Kansal | G06Q 10/0639 705/37 |
| 2002/0186875 A1 | 12/2002 | Burmer et al. | |
| 2003/0037045 A1 | 2/2003 | Melhado | |
| 2004/0210574 A1* | 10/2004 | Aponte | G06Q 10/10 |
| 2005/0027871 A1* | 2/2005 | Bradley | G06F 16/951 709/227 |
| 2006/0053063 A1* | 3/2006 | Nagar | G06Q 10/04 705/26.61 |
| 2007/0130189 A1* | 6/2007 | Moreau | H04L 67/42 |

FOREIGN PATENT DOCUMENTS

| | | |
|---|---|---|
| JP | 2004199300 | 7/2004 |
| JP | 2004252975 | 9/2004 |
| TW | I220198 | 8/2004 |
| WO | 2004027548 | 4/2004 |

OTHER PUBLICATIONS

Preliminary amendment (filed Mar. 14, 2007) for U.S. Appl. No. 11/575,225, filed Mar. 14, 2007, Conf. No. 5265.
Office Action (dated May 5, 2009) for U.S. Appl. No. 11/575,225, filed Mar. 14, 2007, Conf. No. 5265.
Amendment (filed Aug. 5, 2009) for U.S. Appl. No. 11/575,225, filed Mar. 14, 2007, Conf. No. 5265.
Final Office Action (dated Nov. 13, 2009) for U.S. Appl. No. 11/575,225, filed Mar. 14, 2007, Conf. No. 5265.
RCE (filed Feb. 11, 2010) for U.S. Appl. No. 11/575,225, filed Mar. 14, 2007, Conf. No. 5265.
Notice of Allowance (dated Jan. 17, 2014) for U.S. Appl. No. 11/575,225, filed Mar. 14, 2007, Conf. No. 5265.
RCE (filed Feb. 21, 2014) for U.S. Appl. No. 11/575,225, filed Mar. 14, 2007, Conf. No. 5265.
Notice of Allowance (dated Mar. 4, 2014) for U.S. Appl. No. 11/575,225, filed Mar. 14, 2007, Conf. No. 5265.
Hongan Chen et al: "QCWS: an implementation of QoS-capable multimedia web services", Multimedia Software Engineering, 2003. Proceedings. Fifth International Symposium on Dec. 10-12, 2003, Piscataway, NJ, USA, IEEE, Dec. 10, 2003, pp. 38-45, XP010674444; ISBN: 0-7695-2031-6, the whole document.
Al-Ali R J et al: "Supporting QoS-based discovery in service-oriented grids", Parallel and Distributed Processing Symposium, 2003. Proceedings. International April 22-26, 2003, Piscataway, NJ, USA, IEEE, Apr. 22, 2003, pp. 101-109, XP010645637; ISBN: 0-7695-1926-1, the whole document.
M. Searles, P. Perry and L. Murphy: "Probe based dynamic server selection for multimedia QoS", Proc. HET-NETS '03—First Int. Working Conference on Performance Modelling and Evaluation of Heterogeneous Networks, Jul. 21, 2003, XP002372372, Ilkley, England, the whole document.
Liu Yutu et al: "QoS computation and policing in dynamic web service selection" Thirteenth Int. World Wide Web Conf. Proc. WWW; Thirteenth International World Wide Web Conference Proceedings, WWW2004; Thirteenth International World Wide Web Conference Proceedings, WWW2004 2004, May 17, 2004, pp. 63-73, XP002372373, the whole document.

* cited by examiner

METHOD, MEDIUM, AND SYSTEM FOR ENSURING QUALITY OF A SERVICE IN A DISTRIBUTED COMPUTING ENVIRONMENT

This application is a continuation application claiming priority to Ser. No. 11/575,225, filed on Mar. 14, 2007, now U.S. Pat. No. 8,781,909, issued 2014.

FIELD OF THE INVENTION

The present invention relates to a method, a system, and a computer program product for ensuring the quality of a service in a distributed computing environment.

BACKGROUND OF THE INVENTION

E-business continues to be a rapidly evolving area of information technology. Typical e-business transactions include the buying and selling of goods over a computer network, such as the Internet. In general, business entities tend to conduct transactions across the Internet with heterogeneous systems, applications, databases, and communication technologies. These Internet type e-business transactions have typically been defined, by person-to-program interactions. For example, such interactions allow individuals to access programs on network browsers. While these networking systems have been revolutionary in many respects, such networking systems nevertheless present several limitations.

In this regard, web services are emerging as tools for use on the Internet for creating next generation distributed data processing systems. Essentially, web services involve business and consumer applications that enable heterogeneous computer systems to communicate seamlessly over a network; especially in a manner whereby cross platform application integration occurs. Such web services typically rely on standard technology, such as XML and Simple Object Access Protocol (SOAP). Messages between web service requestors and providers are communicated in an XML format and conducted through with the network-neutral SOAP over an HTTP connection. As a result, web services provide an approach for unifying integration of a wide variety of computers and software that are involved in e-business. Use of this approach facilitates program-to-program interactions without requiring user-to-program interactions and this presents, of course, significant advantages.

In a typical web services business transaction, a service requester application queries a web services registry by specifying functions and seeking a registered provider of such services. The web services providers typically publish (e.g., advertise) the services they are making available with a standard encoding called Web Services Description Language (WSDL). The web services requester retrieves the stored information from the registry, including how to connect to the web services provider. Then once a selection occurs, a requester's application and a provider's application communicate for establishing a business transaction.

However, it is often the case that once a business transaction has been established, i.e. a requestor has contracted with a provider for a service that matches the requestors needs, quality of service requirements are often not taken into consideration and the requestor is often disappointed with the results. The above mentioned problem is not just limited to web services, in a grid computing environment it is often the case that quality of service requirements are often not taken into consideration when processing services etc.

Therefore there is a need within the prior art for the aboveforementioned problems to be alleviated.

DISCLOSURE OF THE INVENTION

Viewed from a first aspect, the present invention provides a method for ensuring the quality of a service within a distributed computing environment, the distributed computing environment comprising a plurality of requestors and providers, the method comprising the steps of: broadcasting a request for a service, the request comprising a quality of service requirement, for receiving by a broker, the broker in dependence of receiving the quality of service requirement, identifying a plurality of participating providers; receiving from the plurality of participating providers, the requested service and metadata comprising an operational parameter pertaining to the requested service; analyzing the metadata and the quality of service requirement of the requested service to identify a participating provider performing the requested service to the quality of service requirement.

Advantageously, the present invention allows a requestor to specify a number of quality of service parameters detailing the parameters a requested service should adhere to. For example, a quality of service parameter may state that a requested service should be performed within two hours and the accuracy of the data should not be less than ninety percent. A request for a service is transmitted to a registry for identifying a number of providers who are able to provide the requested service and to the requested quality of service parameters.

Preferably, the present invention provides a method wherein on identifying a participating provider, the requestor binds with the participating provider.

Preferably, the present invention provides a method wherein on identifying a plurality participating providers, the requestor binds with the plurality of participating providers.

Preferably, the present invention provides a method wherein on receiving the requested service to the quality of service requirement, the requestor forms a binding contract with the participating provider.

Preferably, the present invention provides a method wherein the quality of service requirement comprises a plurality of operational parameters.

Preferably, the present invention provides a method wherein each operational parameter comprises a weighting determining a priority order.

Preferably, the present invention provides a method wherein the step of comparing further comprises analyzing using a rules engine to determine a closest match between the metadata and the quality of service requirement.

Preferably, the present invention provides a method wherein on identification of a participating provider performing the service to a quality of service requirement, the requester forms a binding contract with the participating provider.

Viewed from a second aspect the present invention provides a method of matching providers to requestors in a distributed computing environment, the distributed computing environment comprising a plurality of requestors and providers, the method comprising the steps of: broadcasting a request for a service, the request comprising a quality of service requirement, for receiving by a registry component for determining a plurality of participating providers; receiving from the plurality of participating providers, the requested service and metadata comprising an operational parameter of the requested service; and comparing the metadata with the quality of service requirement of the requested service and identifying a provider which performed the requested service to the quality of service requirement.

Preferably, the present invention provides a broker for ensuring quality of service within a distributed computing environment, the distributed computing environment comprising a plurality of requestors and providers, the system comprising: a broadcast component for broadcasting a request for a service, the request comprising a quality of service requirement, for receiving by a registry component for determining a plurality of participating providers; a receiver for receiving from the plurality of participating providers, the requested service and metadata comprising an operational parameter of the requested service; a comparator for comparing the metadata with the quality of service requirement of the requested service and an identifier for identifying a provider which performed the requested service to the quality of service requirement.

Preferably, the present invention provides a broker wherein on identifying a provider; a binding component forms a contract between the requestor and the identified provider.

Preferably, the present invention provides a broker wherein on identifying a provider, a binding component forms a contract between the requestor and a plurality of identified providers.

Preferably, the present invention provides a broker wherein the quality of service requirement comprises a plurality of operational parameters.

Preferably, the present invention provides a broker wherein each operational parameter comprises a weighting determining a priority order.

Preferably, the present invention provides a broker wherein the comparator component comprises analyzing the metadata to determine, using a nearest neighbor mathematical algorithm, the closest match between the metadata and the quality of service requirement.

Viewed from a third aspect, the present invention provides a system for ensuring quality of service within a distributed computing system, the distributed environment comprising a plurality of requestors and providers, the system comprising: a broker for receiving a request for a service from a plurality of requestors, each request comprising a quality of service requirement; performing a lookup in a directory, to identify a provider registering a service matching the received request and within the quality of service requirement.

Viewed from a fourth aspect, the present invention provides a computer program product loadable into the internal memory of a digital computer, comprising software code portions for performing, when said product is run on a computer, to carry out the invention as described above.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
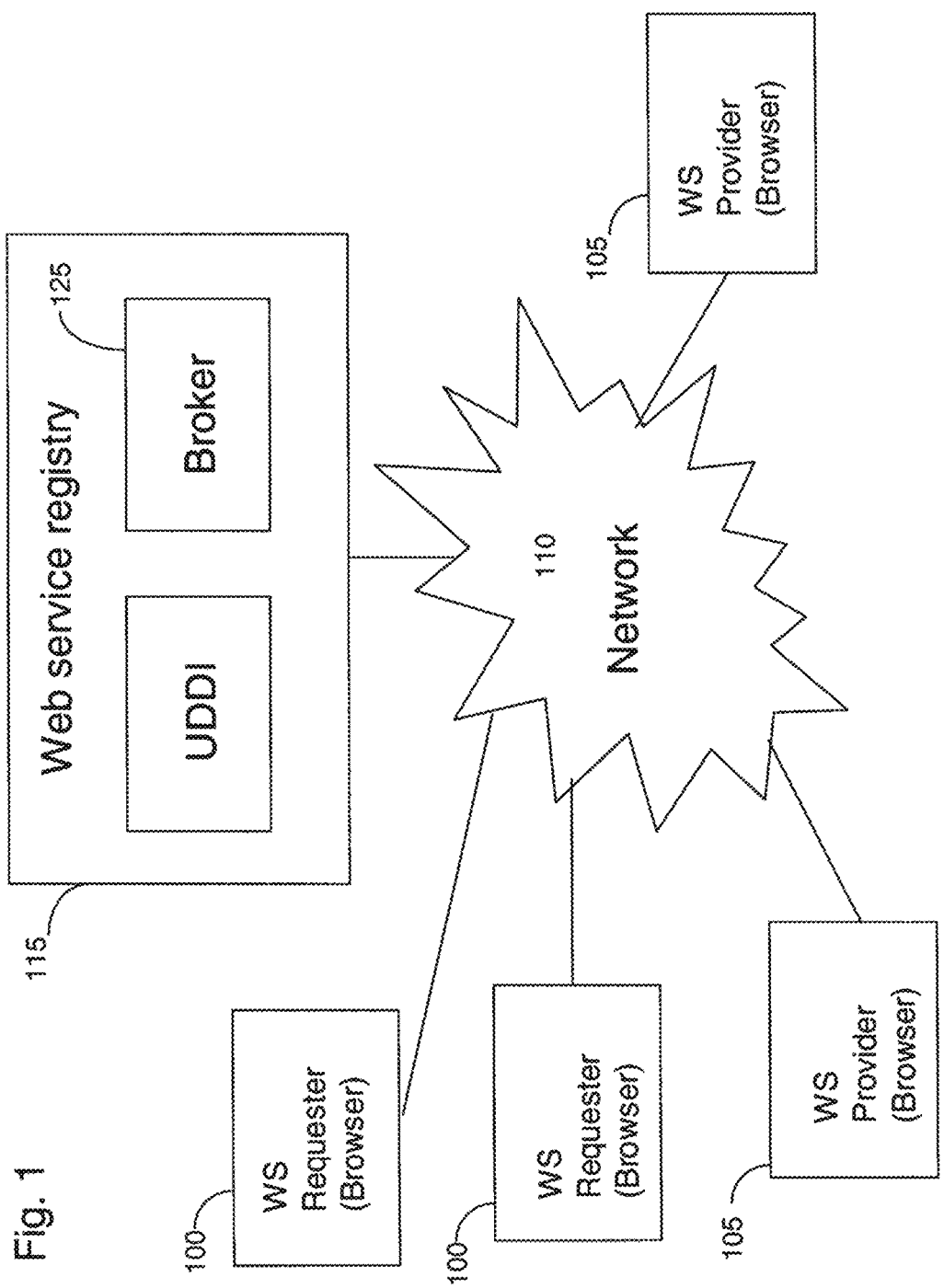
FIG. 1 is a graphical representation of a web services computer network embodying the principles of the present invention.

FIG. 1 illustrates an embodiment of a heterogeneous networked computing environment comprising one or more web services providers 105 and one or more web services requesters 100 that are linked by bi-directional communication lines to a network 110 of coupled web service providers 105 and web service requesters 100. Although, the network 110 is, preferably, the Internet, other networks, such as local-area networks, wide-area networks, or wireless networks are contemplated. The network 110 is operable for working with the appropriate network protocols, for example, HTTP. The network 110 is preferably loosely coupled and is designed across modules to reduce the interdependencies across modules or components. Also, while a network as noted is illustrated, it will be appreciated that a stand-alone computer system to which the web service requesters 105 and web service providers 100 are tightly coupled is also envisioned.

In a web services environment, web service providers 105 publish their services via a Universal Description, Discovery and Integration (UDDI) web services registry 115. The web services registry 115 is, preferably, a global, public, online directory that provides web service requestors 100 with a uniform way to describe their services and to discover other companies' services. Essentially, the UDDI web services registry 115 contains listings of web service providers 105 and each listing contains categories of web services provided by each web service provider 105. The UDDI registry 115 provides an XML interface for allowing a web services requester 100 access to the shared directory and allows publishing of the services of the web services providers 105. As known, the web services registry 115 uses an application that allows creation of web pages for allowing web service requesters 100 to define the several attributes of the request that are inputted. The web services registry 115 further comprises a web service broker 125 for matching the quality of service requirements broadcasted from the web services providers 105.

While a web services type environment is preferred, other systems for linking service resources on demand are contemplated. These attributes relate to the kinds of goods and services, information, etc. which the web services requester 100 desires and, of course, is usable in the system. For example, the web services requester 100 requests information for its specific business applications.

Figure 2:
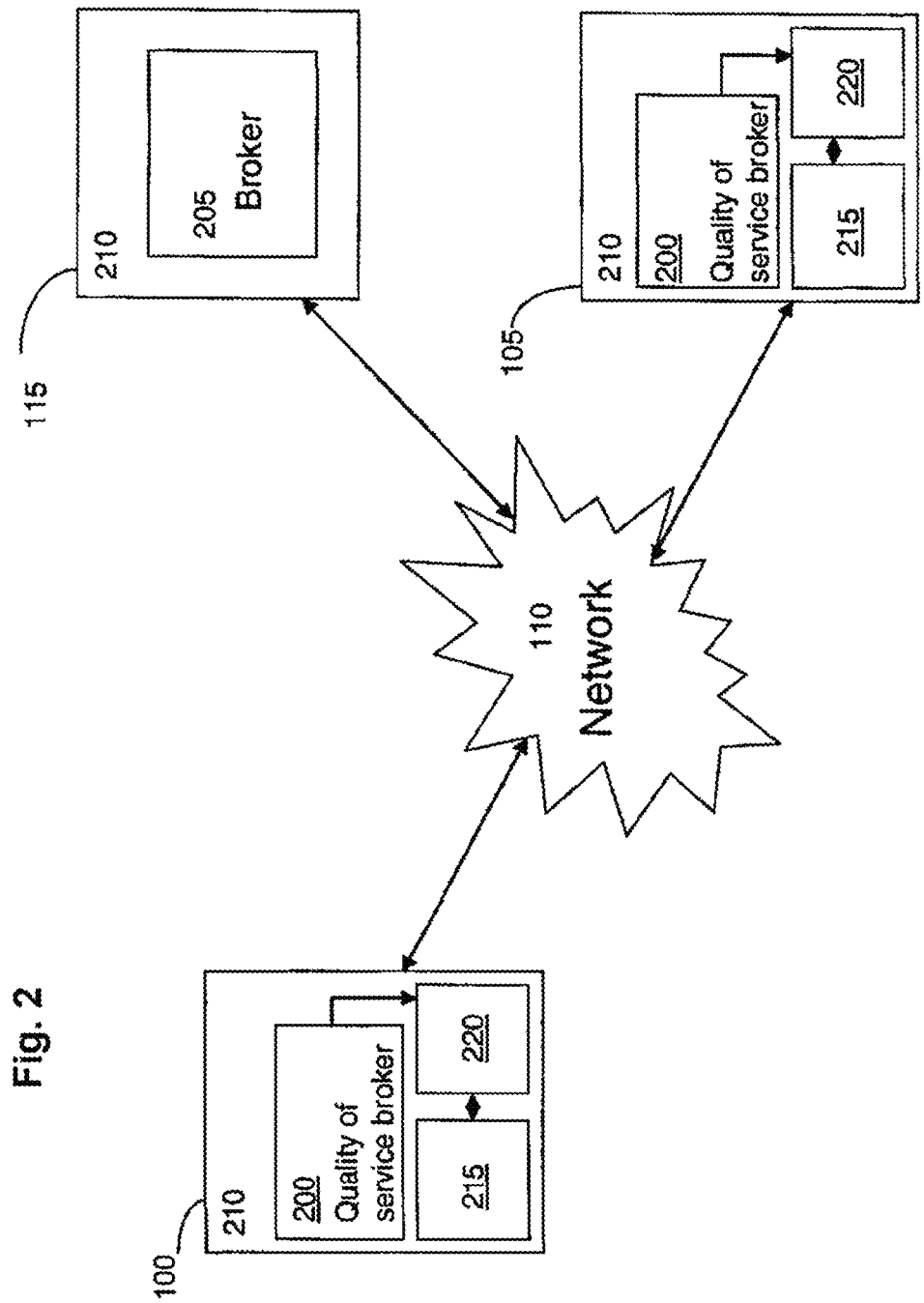
FIG. 2 is a schematic representation of the quality of service broker according to the present invention.

Referring to FIG. 2, there is illustrated one of many preferred embodiments of a networked computer environment that can be used by a web service requesters 100 and web service providers 105. Each web service provider 105 and web service requestor 100 is operable for use with a computer system 210. The web services registry 115 comprises a web services broker 205 which corresponds to the web service broker 125 of FIG. 1. The computer system 210 may be any type of computer or other programmable electronic device including a client computer, a server computer or mobile devices etc.

Each computer system 210 comprises a number of application programs, a web services requester application 215, a browser 220 and a quality of service broker 200. The web services requester application 215 is operable for generating Simple Object Access Protocol (SOAP) requests and transmitting them to web services providers 105 either directly or to other web services providers 105 through a web services registry 115. SOAP is a set of rules that facilitate the XML exchange between the one or more applications of the web services requesters 100 and one or more web service providers 105. Each computer system 210 comprises a processor and a computer readable memory unit coupled to the processor, said memory unit containing software code that when executed by the processor implements the methods and algorithms of the present invention described herein. A computer program product comprises a computer usable medium (e.g., the computer readable memory unit) having the software code embodied therein, said computer software code containing instructions that when executed by the processor of the computer system 210 implement the methods and algorithms of the present invention described herein.

The web service requester 100 receives and interprets the responses from the web service provider 105, as will be described. Also, the web service requester application 215 can be a plug-in type for legacy applications. Such legacy applications would be converted to a web services environment by adding functions to handle SOAP and WSDL. In another preferred embodiment, the browser 220 could be used in a client-server embodiment, wherein the browser 220 would interact with the web services requester application 215 on an application server. Each computer system 210 communicates with each other computer systems over a network 110, as previously explained.

As will be explained, a quality of service broker 200 is located on each computer system 210 pertaining to the web service providers 105 and requestors 100. The quality of service broker 200 provides an interface for entering a number of quality of service requirements which pertain to a requested service. The components of the quality of service broker 200 will be explained with reference to FIG. 3.

Figure 3:
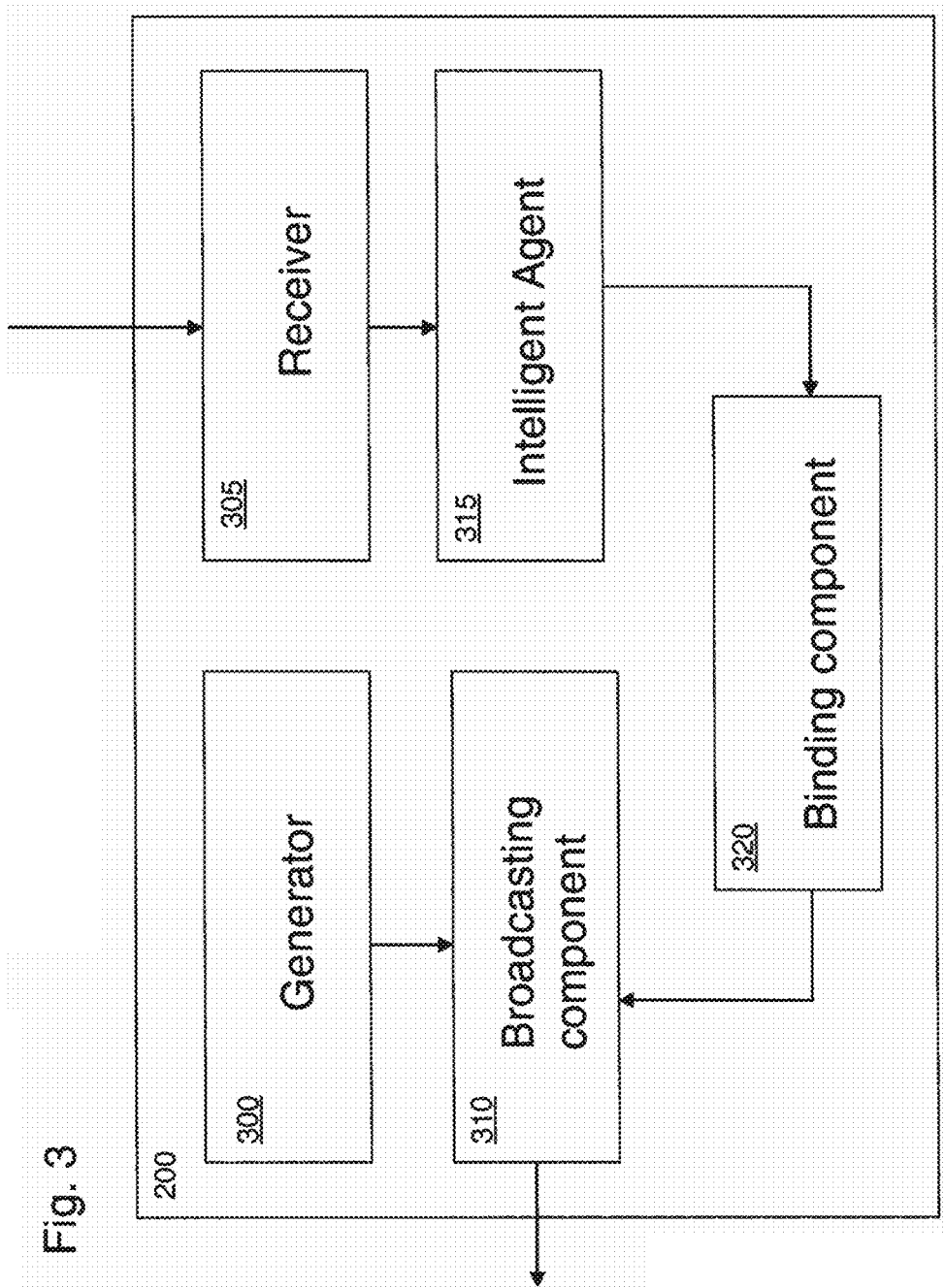
FIG. 3 is a component diagram detailing the components of the quality of service broker.

FIG. 3 shows a quality of service broker 200 which is operable for cooperating with the web browser 220 for sending and receiving requests. The quality of service broker 200 is operable for establishing quality of service requirements for a requested service, identifying a plurality of service providers 105 willing to compete for the service within the identified quality of service requirements and in response to each of the web service providers 105 delivering the requested service; the web service requester 100 selecting the preferred service. On selection of the preferred service provider 105 the requestor may contract with the preferred service provider 105 for further services.

The quality of service broker 200 comprises one or more components that modify and extends the functionality of the web service requestor application 215. The components comprise a generator component 300 comprising an interface for receiving one of more quality of service parameters as specified by the web service requestor 100, a broadcast component 310 for broadcasting the request for a service along with the quality of service requirements to a number of web service providers 105, a receiver component 305 for receiving the performed service and statistical data relating to the quality of service requirements, an intelligent agent 315 for determining which service provider has performed the requested service within the requested quality of service requirements and a binding component 320 for binding with one of the web service providers 105 who's service is determined as complying, or is determined as closely complying, within the quality of service parameter.

In order to request that a service is performed within certain quality of service requirements, firstly, a web service requestor 100 must identify to the service providers 105 under what criteria they will be willing to contract to. For example, for a particular request, a web services requestor 100 may determine that the request should preferably be completed within a specified time limit, therefore the web service requestor 100 may broadcast these requirements to the web service providers 105 in order for the web service providers 105 to carryout the work within the designated time period. It is not until the work has been returned from all of the web service providers 105 that the web services requestors 100 contract with the most preferred web service provider 105. Alternatively, the web service requestor 100 many contract with the web service provider 105 who returns the performed service to the web service requestor 100 within the quickest time period.

A quality of service requirement may comprise one or more of the following parameters:
the length of time taken to complete the service O taking into account server latency, unreliability of the HTTP transport mechanism
accuracy of the completed service
cost of the completed service
security of the requestor's data whilst the data is being processed
type of service being performed
whether the service is being performed by a particular service provider or sub contracted to other service providers
accessibility of the service Any number of the above parameters may be specified by the web services requestor 100 and thus, comprising a combination of parameters that a web service requestor 100 wishes their service to be performed within by a web service provider 105. Each parameter may comprise a weighting; each weighting giving a higher or lower priority to a parameter. These weightings may be selected by the web service requestor 100 at the time of communicating their request to the web service registry 115. The weightings may determine the order of importance of the parameters to the web service requestor. An example is as follows:

| Quality of service parameter | Weighting |
| --- | --- |
| Length of time to complete requested service | 3 |
| Accuracy of completed service | 2 |
| Cost of the completed service | 1 |
| Security of the requestors data | 4 |
| Type of service being performed | 6 |
| Accessibility of the service | 5 |

As is shown the table above, each of the quality of service parameters are assigned a weighting. In this example, a numerical value of 1 signifies a higher value than the numerical value of 2, but it will be appreciated by a person skilled in the art that other values may be used to represent a higher or lower value.

Referring to the table above, each of the parameters is assigned a priority weighting from 1 to 6. This signifies to the web service broker 115, which parameters are of higher importance to the web service requestor 100. In summary, the quality of service requirements in the table above comprises at least one service quality requirement selected from the group consisting of: a length of time requirement comprising a requirement to perform the service within a specified length of time, an accuracy requirement comprising a requirement to perform the service in conformity with a specified accuracy, a cost requirement comprising a requirement to perform the service within a specified cost, a security requirement comprising a requirement to perform the service in conformity with a specified security level, a service type requirement comprising a requirement to perform the service as a specified type of service, an accessibility requirement comprising a requirement to make the service accessible to the requester in accordance with a specified accessibility standard as the service is being performed, and combinations thereof.

Preferably, the web services broker 115 will match a web service provider 105, who can perform the service conforming within the specified parameters and within the priority weights assigned. There may be more than one web services provider 105 which matches (i.e., satisfies) the parameters requested by the web services requestor 100. If this is the case, the web services broker 115 will broadcast the parameters to all of the identified web service providers 105. Alternatively, the web service broker 115 may match the web service providers to the requested parameters by the highest priority order only.

In order for requestors 100 and service providers 105 to successfully communicate quality of service requirements, it is advisable that a standard representation and notation is developed for describing the quality of service parameters in a unified format.

In a web services environment a standard notation called WSDL is employed to describe a web service. WSDL service description comprises an abstract definition for a set of operations and messages. In order to create a WSDL service description, the description must conform to the data types of the web services registry 115—which are, business entity, business service, binding template and a tmodel. The business entity provides information about a business and can comprise one or more service providers. The technical and business descriptions for a web service are defined in a business service and its binding template. Each binding template comprises a reference to one or more tModels. A tModel is used to define the technical specification of a service. The WSDL language is modified to incorporate the description of a quality of service requirement for a particular service. For example, within a WSDL service interface document an additional tag may be incorporated to hold a description of the quality of service requirements. An example is as follows:

---
WSL Service Implementation document
---
```
<definition......>
    <import............>
    <service = process records>
        <quality of service = service returned 60 minutes>
            <port.........>
        </quality of service>
    </service.........>
</definition.........>
```
---

WSDL specifies a number of tags; the tags define what parameters a request message should contain. The notation that a WSDL file uses to describe message formats is based on XML Schema. In addition to describing message contents, WSDL may define where the service is available and what communications protocol is used to talk to the service. Using the example above, the requestor requests a service whereby a service provider will process a number of records, which is denoted by the <service> tag. Moving on down through the XML schema the quality of service tag <quality of service> specifies the parameter <service returned less then 60 minutes>, meaning that it is of importance that the service is returned to the web service requester 100 within a time frame of less than 60 minutes. Within this tag a web service requestor 100 may also specify a priority rating for the quality of service parameter.

Several tools are available to read a WSDL file and generate the code required to produce syntactically correct messages for a web service. These tools are well known in that art and will not be discussed in any detail.

Before the web service requestor 100 publishes (i.e., broadcasts) the request for the service, the web service requestor 100 may also send the data, which the service provider 105 needs in order to perform the service, for example, the data may comprise 200 employee records to be processed. In one embodiment, the data is sent across the network to each service provider 105 in order for each web service provider 105 to perform the requested service. In one embodiment, a link may be sent to each of the web service provider 105 informing them where the data is located and how each service provider may access the data. This data exchange requires security and confidentiality of data, which is provided by WS-Security. WS-Security enables the extension of SOAP to allow the passing of security tokens which securely identify and authenticate entities, ensuring message integrity and message confidentiality. The quality of service broker 200 is able to work with WS-Security specifications as it is the SOAP technology that is modified and not the quality of service broker 200. Further information on WS-Security may be found at www.ibm.com/research.

The web service providers 105 publish their services, including service attributes, by making them available with the WSDL specification. In this embodiment, the provider application uses WSDL for creating files that include: a services interface definition and a services implementation definition. The published service attributes also comprise quality of service requirements. The quality of service requirements are populated to include parameters that the web service provider 100 is able to deliver their service to, for example, within a designated time period. These quality of service parameters may then be matched against the quality of service parameters requested by the web service requestors 100.

On receiving the WSDL specification and the data to be processed from the web services requestor 100, the web service broker 115 performs a lookup in a data store to determine a match for the requested service against the quality of service requirements. A query language is used to query the data store to locate a service provider 105 registered as offering the service and matching the quality of service requirements in the order of importance specified by the requestor.

On identification of one or more web service providers 105 by the web services broker 115, the web service broker 115 broadcasts the data to each of the identified service providers 105. An identified service provider 105 makes a determination as to whether to participate in order to provide the requested web service. If the web service provider 105 decides to participate, the web service provider 105 receives the information from the web service requestor 100 detailing the information to be processed and proceeds to bind with the web service requestor 100 in order to provide a technical interface and transmit the requested web service to the web service requestor 100. Each participating web service provider 105 binds with the web service requestor in order to provide the technical interface for data exchange.

On completion of the service, each web service provider 105 transmits to the requestor the completed service, along with statistical data pertaining to the requested quality of service parameters, for receiving by the receiver component 305. For example, if the requested quality of service parameters are 'the requested service should be completed within a designated time period, the cost of the service should not exceed one pound and the accuracy of the data must not be less that ninety eight percent', the statistical data relating to the parameters would comprise, how long the service took to perform, the cost of the service and the accuracy of the data. This is advantageous, as the time, cost and accuracy of the service may vary over a period of time, due to economic variables of the service provider. Further this encourages web service providers to perform services to the highest standard possible within the quality of service parameters as requested by the web services requestor.

Once the web services requestor 100 is in receipt of all of the statistical data received from each of the web service providers 105 whom participated in performing the service; the intelligent agent 315 of the web service requestor 100 determines which web services provider 105 to contract with. The intelligent agent 315 determines a preferred service provider, namely the service provider 105 that was able to perform the service which closely matched the requested requirements. The intelligent agent 310 is operable for use with a data matching algorithm, or rules engine for parsing the requested requirements along with the received statistical data in order to find the closest match. The closest match may be determined by the priority order in which the web service requestor 100 ranked their requirements (i.e., by most closely matching a contiguous sequence of the highest priorities of the priority order), or alternatively, the first web service provider 105 to return a set of results that match all of the web service requestor's 100 requirements. An identification of the preferred service provider is provided to the requestor 100 by being sent to and/or stored in a computer readable memory unit of the computer system 210 of the requestor 100 and may be accessed by and/or displayed to the requestor 100 on the computer system 210 (e.g., by being displayed on a computer screen, printed, etc.).

On identification of the preferred web service provider 105, the web service requestor 100 may enter into a binding contract, for future performance of the performed service, or a binding contract for further services. It is important to note that the binding of the contract is always performed after selection of the preferred service providers.

The above description describes an example, in which, the web service requestor 100 selects and contracts with only one web service provider 115. In another embodiment, the web service requestor may select and contract with more than one web service provider 115 and use the processed web service from the more than one web service provider for a number of different purposes. Thus, although, an embodiment is described wherein, a one to one relationship is described between a web service requestor 100 and a web service provider 105, it is also envisaged that there may be a many to many relationship between the web service provider 100 and the performed service as requested by the web service requestor 115.

Figure 4:
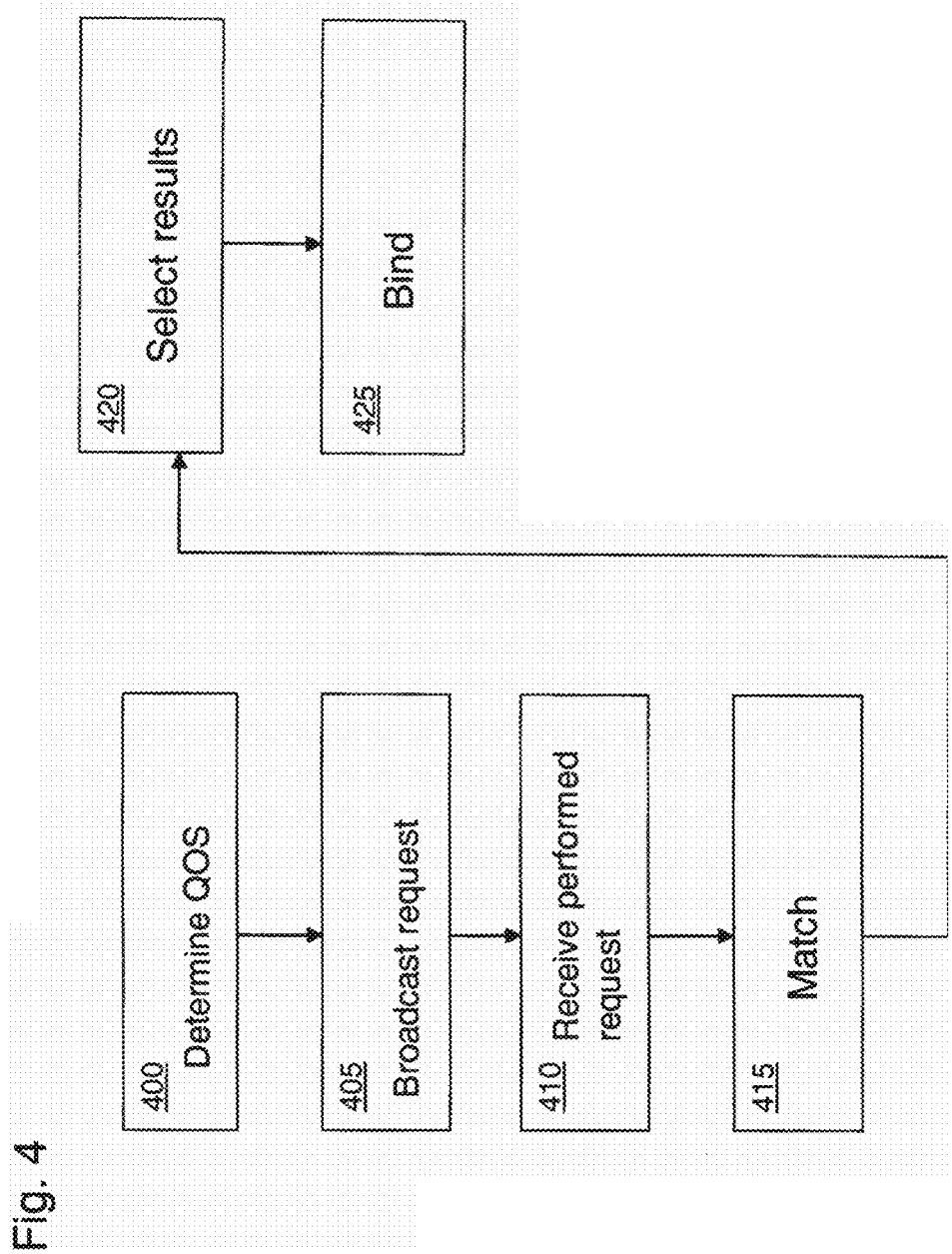
FIG. 4 is a flow chart detailing the operational steps of the quality of service broker.

Moving onto FIG. 4, the operational steps of the web service requestor 100 is shown. At step 400, the web service requestor 100 via the generator component 300 receives one or a number of quality or service parameter(s) for specifying in a WSDL specification. At step 405, the broadcast component 310, broadcasts the WSDL specification to a number or service providers 105 or to a web service broker 115. Once the web service broker 115 has matched the quality of service requirements to one or a number of web service provider(s) 105; the web service providers 105 make a determination as whether to participate and to provide the service. On a positive determination, each participating web service provider 115 proceeds to bind with the web service requestor 100 in order to define the technical interface to allow the exchange of data. On completion of the requested web service, the requested web service is returned to the web service requestor 100 in step 410. The web service provider 105 also returns a set of statistical data detailing performance statistics for the preformed service. At step 415, the intelligent agent 315 parses the received statistical data to match the statistical data against the quality of service parameters to determine which service providers were able to perform the service closest to the requested quality of service requirements.

At step 420, the intelligent agent 315 returns the results and, the best performing i.e. within the specified quality of service requirements, web service provider 105 is selected. Alternatively, more than one web service provider may be selected to contract with and thus, the results of more than performed web service used.

At step 425, the binding component 320 communicates with the selected service provider 105 in order to contract with the selected service provider for either the performed service of for future requested services.

Figure 5:
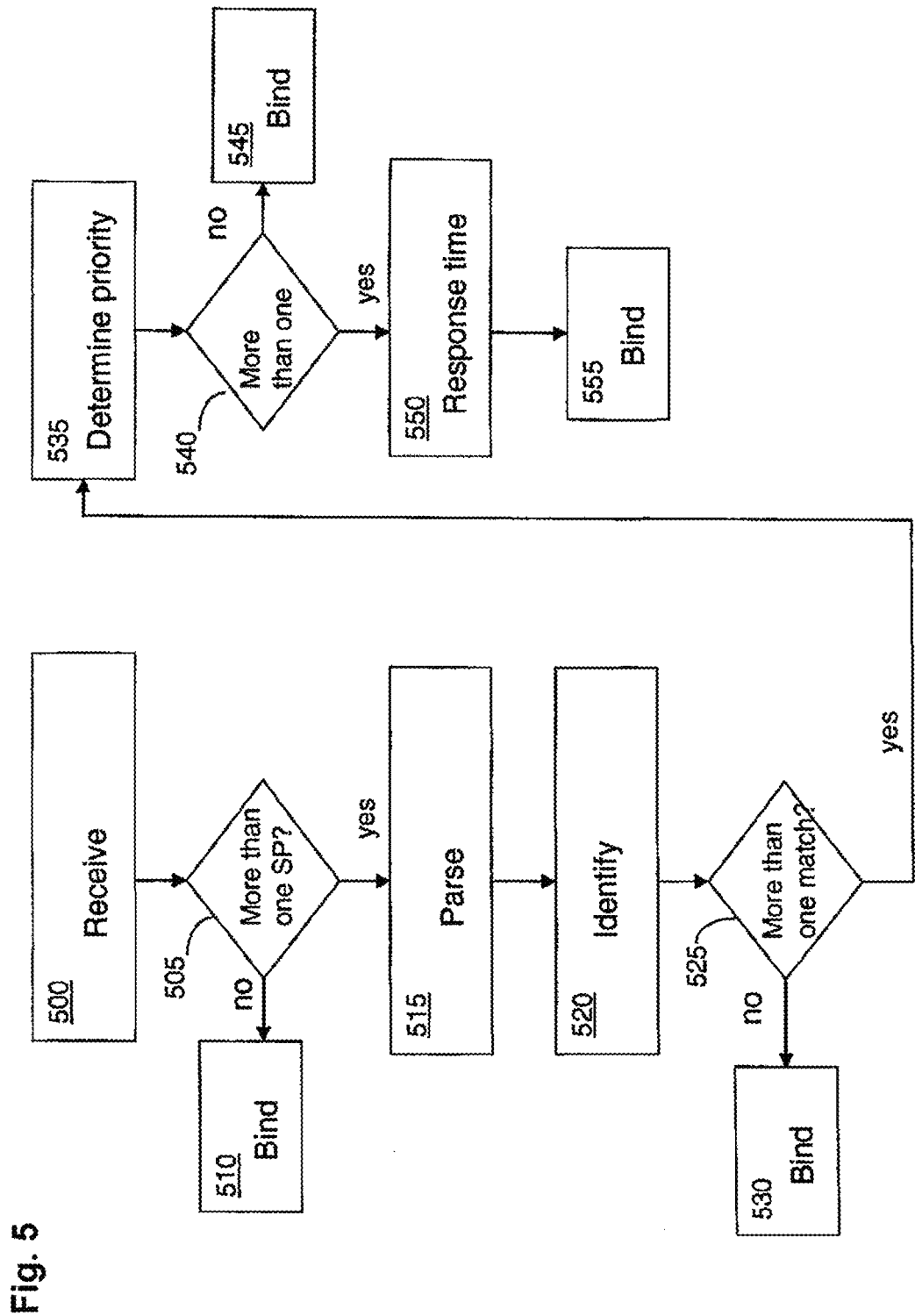
FIG. 5 is a flow chart detailing the operational steps of the binding component of the quality of service broker as shown in FIG. 2.

Moving onto FIG. 5, more detailed operational steps of the binding component 320 are shown. At step 500, the receiver component 305 receives the performed service and the statistical data. Control moves to determination 505 and a determination is made as to whether more than one service provider has returned the performed service. If the determination is negative and only one web service provider 105 has performed the service, the binding component 320 binds with the service provider in step 510. If the determination is positive and more than one web service provider 105 returns the performed service, the intelligent agent 315 begins to parse the statistical data for each web service provider 105 that has returned the performed service at step 515. As the intelligent agent 315 parses the statistical data, the intelligent agent 315 identifies which web service provider 105 has performed the service within the quality of service requirements at step 520. Once identified, control moves to 525 and a determination is made as to whether the intelligent agent 315 has located more than one web service provider 105.

If the determination is negative and only one web service provider 105 is located, the binding component 320 binds with the located web service provider 105 at step 530. If on the other hand, more than one web service provider 105 is located, the intelligent agent 315 determines whether, the web service requestor wishes to contract with more than one web service provider 105. If the determination is yes, the intelligent agent proceeds to select which web service providers to contract with. In order to determine which web service providers to select, the intelligent agent may select the web service providers that performed the requested service that most closely match the quality of service parameters. Alternatively, the priority order of each of the quality of service requirements as requested by the web service requestor 100, is determined at step 535, as a determiner to which web service providers to select. If the intelligent agent 315 locates more than one service provider (control 540) which matches the priority order, the intelligent agent 315 moves onto step 550 and calculates which web service provider 105 returned the service within the quickest time and thus contracts to the identified service provider in step 555. Alternatively, moving back to control 540, if only one service provider is located that meets the priority order requirements, the binding component contracts with the identified service provider, at step 545.

What is claimed is:

1. A method for determining a web service provider who subsequently performs a web service within a distributed web computing environment, said method comprising:

generating, by a processor of a web service requestor computer system of a plurality of web service requestor computer systems, a WSDL request which is a request articulated in Web Services Description Language (WSDL), said generating the WSDL request comprising incorporating within the WSDL request both a request for the web service and a specification of an associated plurality of quality of web service requirements for the web service;

broadcasting, by the processor to a web service broker computer system located remote from the web service requestor computer system, the WSDL request, wherein the web service broker computer implements a customized filtering of service providers of web service individually for each web service requestor computer based on quality of web service requirements specific to each web service requestor computer;

receiving, by the processor from the web service broker computer system, at least two providers of web service who are capable of performing the web service within the distributed web computing environment in conformity with a plurality of quality of web service requirements, said at least two providers of web service having been selected by the web service broker computer from multiple service providers of web service via filtering the multiple service providers by matching the plurality of quality of web service requirements to the multiple service providers via use of a web services registry, of web service providers, within the web service broker computer system, wherein the web service requestor computer system, the web service broker computer system, and the multiple service providers are mutually communicatively coupled via the Internet within the distributed web computing environment, wherein the distributed web computing environment includes the Internet, the web service requestor computer system, the web service broker computer system, and the multiple service providers;

after said broadcasting, receiving, by the processor from each web service provider of a plurality of web service providers of the at least two providers of web service, an indication of willingness by each web service provider to perform the web service within the distributed web computing environment in conformity with the plurality of quality of web service requirements;

after said receiving the indication of willingness from each web service provider, receiving, by the processor from each web service provider, both an indication of previous performance of the web service within the distributed web computing environment by each web service provider and statistical data indicative of an extent to which said previous performance of the web service within the distributed web computing environment by each web service provider matches each quality of web service requirement;

after said receiving the indication of previous performance and the statistical data from each web service provider, ascertaining, by the processor, a preferred web service provider of the plurality of web service providers, wherein said ascertaining comprises analyzing the statistical data received from each web service provider and concluding from said analyzing that the performance of the web service within the distributed web computing environment by the preferred web service provider is a closer match to the plurality of quality of web service requirements than is a match of the performance of the web service within the distributed web computing environment by each other web service provider to the plurality of quality of web service requirements, and wherein the previous web service is performed within the distributed web computing environment by each web service provider after each web service provider indicated the willingness and before said ascertaining; and storing an identification of the preferred web service provider in a computer-readable storage unit of the web service broker computer system, wherein the web service is executed within the distributed web computing environment by the preferred web service provider after said concluding, wherein a performance of the web service that was executed within the distributed web computing environment by the preferred web service provider after said concluding is characterized by the closer match to the plurality of quality of web service requirements, and wherein the plurality of quality of web service requirements comprises a length of time requirement comprising a requirement to perform the web service within the distributed web computing environment within a specified length of time, an accuracy requirement comprising a requirement to perform the web service within the distributed web computing environment in conformity with a specified accuracy, and a security requirement comprising a requirement to perform the web service within the distributed web computing environment in conformity with a specified security level.

2. The method of claim 1, wherein the method further comprises:

receiving, by the processor from a web service requestor, the WSDL request for the web service and the plurality of quality of web service requirements; and after said receiving the WSDL request and prior to said broadcasting, receiving, by the processor, an identification of the at least two providers of web service.

3. The method of claim 2, wherein the method further comprises receiving, by the processor from the web service requestor, a relative priority for each quality of web service requirement to determine a priority order of the quality of web service requirements; and wherein the closer match is a function of conformity of the performance of each web service provider to the priority order.

4. The method of claim 3, wherein the closer match is based on the performance of the web service by the preferred web service provider being a closer match to a contiguous sequence of the highest priorities of the priority order than is a match to the priority order of the performance of the web service by each other web service provider of the plurality of web service providers.

5. The method of claim 3, wherein more than one web service provider of the plurality of web service providers have a same highest conformity of performance to the priority order, resulting in the closer match being based on the performance of the web service by the preferred web service provider being accomplished sooner than that of any other web service provider of the more than one web service provider.

6. The method of claim 1, wherein the closer match is based on the performance of the web service by the preferred web service provider being accomplished in less time than was accomplished by any other web service provider of the plurality of web service providers.

7. A web service requestor computer system comprising a processor and a computer readable memory unit coupled to the processor, said memory unit containing software code that when executed by the processor implements a method for determining a web service provider who subsequently performs a web service within a distributed web computing environment, said method comprising:

generating, by a processor of a web service requestor computer system of a plurality of web service requestor computer systems, a WSDL request which is a request articulated in Web Services Description Language (WSDL), said generating the WSDL request comprising incorporating within the WSDL request both a request for the web service and a specification of an associated plurality of quality of web service requirements for the web service;

broadcasting, by the processor to a web service broker computer system located remote from the web service requestor computer system, the WSDL request, wherein the web service broker computer implements a customized filtering of service providers of web service individually for each web service requestor computer based on quality of web service requirements specific to each web service requestor computer;

receiving, by the processor from the web service broker computer system, at least two providers of web service who are capable of performing the web service within the distributed web computing environment in conformity with a plurality of quality of web service requirements, said at least two providers of web service having been selected by the web service broker computer from multiple service providers of web service via filtering the multiple service providers by matching the plurality of quality of web service requirements to the multiple service providers via use of a web services registry, of web service providers, within the web service broker computer system, wherein the web service requestor computer system, the web service broker computer system, and the multiple service providers are mutually communicatively coupled via the Internet within the distributed web computing environment, wherein the distributed web computing environment includes the Internet, the web service requestor computer system, the web service broker computer system, and the multiple service providers;

after said broadcasting, receiving, by the processor from each web service provider of a plurality of web service providers of the at least two providers of web service, an indication of willingness by each web service provider to perform the web service within the distributed web computing environment in conformity with the plurality of quality of web service requirements;

after said receiving the indication of willingness from each web service provider, receiving, by the processor from each web service provider, both an indication of previous performance of the web service within the distributed web computing environment by each web service provider and statistical data indicative of an extent to which said previous performance of the web service within the distributed web computing environment by each web service provider matches each quality of web service requirement;

after said receiving the indication of previous performance and the statistical data from each web service provider, ascertaining, by the processor, a preferred web service provider of the plurality of web service providers, wherein said ascertaining comprises analyzing the statistical data received from each web service provider and concluding from said analyzing that the performance of the web service within the distributed web computing environment by the preferred web service provider is a closer match to the plurality of quality of web service requirements than is a match of the performance of the web service within the distributed web computing environment by each other web service provider to the plurality of quality of web service requirements, and wherein the previous web service is performed within the distributed web computing environment by each web service provider after each web service provider indicated the willingness and before said ascertaining; and storing an identification of the preferred web service provider in a computer-readable storage unit of the web service broker requestor computer system, wherein the web service is executed within the distributed web computing environment by the preferred web service provider after said concluding, wherein a performance of the web service that was executed within the distributed web computing environment by the preferred web service provider after said concluding is characterized by the closer match to the plurality of quality of web service requirements, and wherein the plurality of quality of web service requirements comprises a length of time requirement comprising a requirement to perform the web service within the distributed web computing environment within a specified length of time, an accuracy requirement comprising a requirement to perform the web service within the distributed web computing environment in conformity with a specified accuracy, and a security requirement comprising a requirement to perform the web service within the distributed web computing environment in conformity with a specified security level.

8. The web service broker computer system of claim 7, wherein the method further comprises:

receiving, by the processor from a web service requestor, the request for the web service and the plurality of quality of web service requirements; and after said receiving the WSDL request and prior to said broadcasting, receiving, by the processor, an identification of the at least two providers of web service.

9. The web service broker computer system of claim 8, wherein the method further comprises receiving, by the processor from the web service requestor, a relative priority for each quality of web service requirement to determine a priority order of the quality of web service requirements; and wherein the closer match is a function of conformity of the performance of each web service provider to the priority order.

10. The web service broker computer system of claim 9, wherein the closer match is based on the performance of the web service by the preferred web service provider being a closer match to a contiguous sequence of the highest priorities of the priority order than is a match to the priority order of the performance of the web service by each other web service provider of the plurality of web service providers.

11. The web service broker computer system of claim 9, wherein more than one web service provider of the plurality of web service providers have a same highest conformity of performance to the priority order, resulting in the closer match being based on the performance of the web service by the preferred web service provider being accomplished sooner than that of any other web service provider of the more than one web service provider.

12. A computer program product comprising a computer readable non-transitory storage medium having software code embodied therein, said computer software code containing instructions that when executed by a processor of a web service requestor computer system implements a method for determining a web service provider who subsequently performs a web service within a distributed web computing environment, said method comprising:

generating, by a processor of a web service requestor computer system of a plurality of web service requestor computer systems, a WSDL request which is a request articulated in Web Services Description Language (WSDL), said generating the WSDL request comprising incorporating within the WSDL request both a request for the web service and a specification of an associated plurality of quality of web service requirements for the web service;

broadcasting, by the processor to a web service broker computer system located remote from the web service requestor computer system, the WSDL request, wherein the web service broker computer implements a customized filtering of service providers of web service individually for each web service requestor computer based on quality of web service requirements specific to each web service requestor computer;

receiving, by the processor from the web service broker computer system, at least two providers of web service who are capable of performing the web service within the distributed web computing environment in conformity with a plurality of quality of web service requirements, said at least two providers of web service having been selected by the web service broker computer from multiple service providers of web service via filtering the multiple service providers by matching the plurality of quality of web service requirements to the multiple service providers via use of a web services registry, of web service providers, within the web service broker computer system, wherein the web service requestor computer system, the web service broker computer system, and the multiple service providers are mutually communicatively coupled via the Internet within the distributed web computing environment, wherein the distributed web computing environment includes the Internet, the web service requestor computer system, the web service broker computer system, and the multiple service providers;

after said broadcasting, receiving, by the processor from each web service provider of a plurality of web service providers of the at least two providers of web service, an indication of willingness by each web service provider to perform the web service within the distributed web computing environment in conformity with the plurality of quality of web service requirements;

after said receiving the indication of willingness from each web service provider, receiving, by the processor from each web service provider, both an indication of previous performance of the web service within the distributed web computing environment by each web service provider and statistical data indicative of an extent to which said previous performance of the web service within the distributed web computing environment by each web service provider matches each quality of web service requirement;

after said receiving the indication of previous performance and the statistical data from each web service provider, ascertaining, by the processor, a preferred web service provider of the plurality of web service providers, wherein said ascertaining comprises analyzing the statistical data received from each web service provider and concluding from said analyzing that the performance of the web service within the distributed web computing environment by the preferred web service provider is a closer match to the plurality of quality of web service requirements than is a match of the performance of the web service within the distributed web computing environment by each other web service provider to the plurality of quality of web service requirements, and wherein the previous web service is performed within the distributed web computing environment by each web service provider after each web service provider indicated the willingness and before said ascertaining; and storing an identification of the preferred web service provider in a computer-readable storage unit of the web service broker requestor computer system, wherein the web service is executed within the distributed web computing environment by the preferred web service provider after said concluding, wherein a performance of the web service that was executed within the distributed web computing environment by the preferred web service provider after said concluding is characterized by the closer match to the plurality of quality of web service requirements, and wherein the plurality of quality of web service requirements comprises a length of time requirement comprising a requirement to perform the web service within the distributed web computing environment within a specified length of time, an accuracy requirement comprising a requirement to perform the web service within the distributed web computing environment in conformity with a specified accuracy, and a security requirement comprising a requirement to perform the web service within the distributed web computing environment in conformity with a specified security level.

13. The computer program product of claim 12, wherein the method further comprises:

receiving, by the processor from a web service requestor, the request for the web service and the plurality of quality of web service requirements; and after said receiving the WSDL request and prior to said broadcasting, receiving, by the processor, an identification of the at least two providers of web service.

14. The computer program product of claim 13,
wherein the method further comprises receiving, by the processor from the web service requestor, a relative priority for each quality of web service requirement to determine a priority order of the quality of web service requirements; and
wherein the closer match is a function of conformity of the performance of each web service provider to the priority order.

15. The computer program product of claim 14, wherein the closer match is based on the performance of the web service by the preferred web service provider being a closer match to a contiguous sequence of the highest priorities of the priority order than is a match to the priority order of the performance of the web service by each other web service provider of the plurality of web service providers.

16. The computer program product of claim 14, wherein more than one web service provider of the plurality of web service providers have a same highest conformity of performance to the priority order, resulting in the closer match being based on the performance of the web service by the preferred web service provider being accomplished sooner than that of any other web service provider of the more than one web service provider.

* * * * *